(12) United States Patent
Seamans

(10) Patent No.: US 6,504,098 B2
(45) Date of Patent: Jan. 7, 2003

(54) ARCHITECTURAL MOLDINGS FOR PROTECTING, CONCEALING AND ACCESSING INDOOR WIRING AND CABLES

(76) Inventor: James D. Seamans, 143 E. Wilde Yaupon, The Woodlands, TX (US) 77381

( * ) Notice: Subject to any disclaimer, the term of this patent is extended or adjusted under 35 U.S.C. 154(b) by 0 days.

(21) Appl. No.: 09/836,022

(22) Filed: Apr. 17, 2001

(65) Prior Publication Data

US 2002/0148627 A1 Oct. 17, 2002

(51) Int. Cl.[7] .................................................. H02G 3/04
(52) U.S. Cl. ...................................... 174/68.3; 439/120
(58) Field of Search ........................ 174/48, 68.1, 68.3, 174/95, 96, 97, 101; 362/145; 52/220.5, 210, 211, 716.1; 439/120; 459/209, 212

(56) References Cited

U.S. PATENT DOCUMENTS

| | | | |
|---|---|---|---|
| 1,963,662 A | | 6/1934 | Knapp |
| 3,721,762 A | | 3/1973 | Gooding |
| 4,423,284 A | | 12/1983 | Kaplan |
| 4,800,695 A | | 1/1989 | Menchetti |
| 5,222,343 A | * | 6/1993 | Anderson .................. 52/211 X |
| 5,551,201 A | * | 9/1996 | Anderson .................. 52/17.05 |
| 5,676,558 A | * | 10/1997 | Mayer ........................ 439/209 |
| 5,724,909 A | * | 3/1998 | Pitman et al. .............. 116/202 |
| 5,732,747 A | * | 3/1998 | Holliday .................... 174/48 X |
| 5,823,655 A | * | 10/1998 | Brooks ........................ 362/145 |
| 5,967,820 A | * | 10/1999 | Siegal et al. ................ 439/214 |
| 6,173,542 B1 | * | 1/2001 | Wright ........................ 52/211 |
| 6,178,700 B1 | * | 1/2001 | Mayer, Jr. .................. 52/210 X |
| 6,191,363 B1 | * | 2/2001 | Samuels ..................... 174/68.3 |

* cited by examiner

Primary Examiner—Dean A. Reichard
Assistant Examiner—Dhira R. Patel
(74) Attorney, Agent, or Firm—Mary J. Gaskin

(57) ABSTRACT

A system of architectural moldings that, when installed, form a passage for electrical wiring, coaxial cables, fiber optic cables, and associated devices used in the transmission of low-voltage power, communication, and control signals. The architectural moldings may also be used to cover and improve the aesthetic appeal of pre-existing wiring raceways and conduits. The system as a whole may be installed during construction of new a home or building or when retrofitting an existing structure. The moldings can be removably mounted on the interior surfaces of residential and commercial structures in a manner that allows for easy removal and replacement of some or all of the molding without disturbing the enclosed wiring and cables or harming finished surfaces. The moldings may be made of wood, polyurethane, fiberboard, or any material that is suitable to manufacture pieces that resemble baseboards, cornice moldings, chair rails, casings, or other interior millwork for homes or commercial structures. The system of moldings greatly facilitates any upgrades or modifications to the number, type, or placement of wiring, cables, outlets, jacks, or associated devices.

10 Claims, 7 Drawing Sheets

ARCHITECTURAL MOLDINGS FOR PROTECTING, CONCEALING AND ACCESSING INDOOR WIRING AND CABLES

BACKGROUND OF THE INVENTION

1. Field of the Invention

This invention relates to coverings or enclosures for electrical wiring and cables. More particularly, it relates to novel and improved protective architectural moldings that have the appearance of wood millwork and that provide channels for electrical wiring, cables, and associated devices. Sections of the moldings may be easily removed and reinstalled to permit modifications to the electrical wiring and cables used for automation, communication, control, entertainment, networking, and/or security systems.

2. Description of the Prior Art

Recent years have brought unprecedented advancement in communication, entertainment, computer networking, security, automation, and control systems for homes and commercial buildings. Most existing homes were not built to accommodate these new technologies. Furthermore, the current rate of change in these technologies makes it very difficult to pre-wire new "smart" homes and buildings to fully anticipate future needs and opportunities. The design philosophy for these new systems is typically one of "star" or "hub and spoke" topography that requires most devices to be connected individually back to a central hub or connection point. The star topography requires an increasing number of wires and cables in greater lengths, compounding the difficulty of accommodating the new technologies. As a result, an unmet need exists for an attractive, cost-effective, and easily modifiable means of accommodating the wiring and cables for these complex electronic systems in existing structures and for future-proofing new construction for the technologies being developed.

Existing finished structures, in particular, present difficulties to installing such systems or networks due to the complications of running wiring and cables in the interior of walls that have already been covered. Snaking electrical lines vertically in the space between wall studs is feasible for short runs of wiring or cable to complete the last few feet of connection to a device or jack. The greater need, however, is to link all the cables and wires in a generally horizontal direction back to a central connection and control hub. However, running wiring and cables horizontally through the studs is difficult, time-consuming, and disruptive to the finished structure. Portions of the wallboard must be cut out, holes drilled through or notches cut in the studs, and the wall surfaces must be patched and refinished after installation. The drilling of holes or notching of studs can weaken the structure. The demolition and repair procedure is often much more costly and time-consuming than the actual running of cables. The installer risks running into existing electrical power lines, plumbing lines, or other obstructions concealed within the walls, ceilings, and floors. Exterior walls and shared walls between adjacent dwelling spaces can make installing these additional wires and cables nearly impossible due to the presence of fiberglass or foam weather insulation, sound insulation, or fire walls.

Surface-mounted wiring raceways and conduits with snap-on covers have been designed for carrying electrical wires, but their use detracts from the appearance of a residence or professional office. Some of these raceways are surface-mounted on walls and other interior surfaces along with existing moldings. Others may take the place of baseboards and are made of materials such as metal or plastic, which have no resemblance to classical wood millwork. Generally, they are considered undesirable for residences because they look like wire raceways rather than finished interior trim that complements the appearance of a home. Furthermore, baseboard-style raceways do not provide means for continuing wiring and cables around doors, windows, or other wall openings to reach any point in the room or to connect these same wires and cables back to a central control hub.

Interior and exterior millwork has been used for centuries to provide an attractive, finished look to homes and commercial structures. To date, millwork has not been designed to carry low-voltage electrical power, automation, communication, and/or control wiring and cables, or to be removable in order to modify wiring and cables without defacing the finished surfaces of a home or office.

SUMMARY OF THE INVENTION

Applicant's invention includes individual pieces of millwork having surfaces which duplicate interior and exterior trim work. The millwork is designed to provide at least one channel or conduit for wiring, cables, and other power, communication, networking, and control transmissions, or to cover existing wiring conduits and raceways. In addition, the invention includes the combination of these pieces with each other and/or with interior wall, floor, or ceiling space penetrations in order to complete all or a portion of a network or automation system in a residential or commercial structure.

In addition, the moldings are designed so that sections may be easily removed and reinstalled in order to facilitate installation and modification of the covered wiring and cables. Typical means of removably attaching the moldings include the following: double stick foam tape; a hook and loop fastening system such as Velcro(E; reclosable fasteners such as those made by 3M™; push fasteners; row boat fasteners; and removable/repositionable tape.

The millwork of the present invention may have a natural wood finish, or one that can be painted or stained. The present invention may be constructed from hardwoods such as mahogany, birch, white oak, red oak, maple, ash, walnut, or poplar; soft woods such as cedar, pine, Douglas fir, or redwood; or medium-density fiberboard, polyurethane, and other materials that can be formed to have the appearance of wood.

The millwork of the present invention may have design features of styles to complement the appearance of the room, including Victorian, country, traditional, southwest, colonial, or other architectural styles of the twentieth and earlier centuries.

It is an object of the invention for the baseboard millwork to accommodate and cover wiring and cables when the baseboard is surface-mounted on an interior wall near the floor. It is a further object of the invention for the baseboard to optionally have periodic receptacles, jacks, and ports for the connection of various pieces of electronic equipment, as desired by the user. It is a further object of the invention for the baseboard to provide connections to other trim pieces, such as corner pieces or casings, in order to complete the network in a given room.

Cornice and crown moldings may also be used where convenient for the purpose of covering wiring and cables, again with the object of providing an appealing finish when they are surface-mounted on an interior wall near the ceiling.

These can be particularly useful for connecting speakers, low-voltage lighting, and/or security monitoring devices. They may also be used to cover spaces between ceiling joists for the connection of devices mounted on the ceiling of the room. The inventive molding, mounted at the ceiling level, is also useful for covering wiring around the perimeter of a room, using fewer lineal feet than would be required by a combination of baseboards, door casings, and possibly window casings to circumnavigate an entire room.

Chair rails, or other horizontal trim pieces, may be used in a similar manner for providing a decorative cover for cables and wiring at different elevations between the floor and ceiling.

Door and window casings of the present invention can be used to support and cover sections of the wiring and cables of a network.

Vertical runs of wiring and cables can be achieved by the use of inventive vertical corner trim work, for either interior or exterior comers. Alternatively, vertical runs can also be accomplished by feeding wire vertically within the wall space between studs to connect wiring behind cornice moldings with wiring behind baseboards or door casing moldings.

Corner pieces of various styles are used to provide connections between various horizontal and vertical trim pieces.

The molding of the present invention may also be used to cover penetrations in the walls, floors, or ceilings in order to feed wires and cables from one room to another or to connect wires and cables to electrical jacks, ports, or other devices.

In addition to actually carrying wiring and cables, the millwork of the present invention can be used to cover and camouflage functional wiring raceways and electrical conduits.

A finished appearance in any given layout may require the installation of sections of matching trim work which does not actually carry cables or wiring, if network capabilities are not presently needed for a particular section of a room.

The millwork of the present invention may be used in combination with other hard-wired or wireless systems to complete an automation or control system in a residential or commercial structure.

Depending on the network and connections needed for a particular residential or commercial structure, a combination of the interior and exterior trim, wall, floor, and ceiling penetrations and interior runs, and wiring raceways and conduits, may be used by the designer, builder, or end-user.

An object of this invention is to provide a system for installing wiring and cables which is easier and faster than going through studs in the walls. In addition, some or all of the moldings can be made to be easily removed and reinstalled so as to facilitate future modifications to the wires and cables.

Finally, unlike the currently-available wiring conduits and raceways, the present invention provides an aesthetically-pleasing appearance which complements the decor of the home or commercial structure in which it is installed.

DESCRIPTION OF PREFERRED EMBODIMENTS

Figure 1:
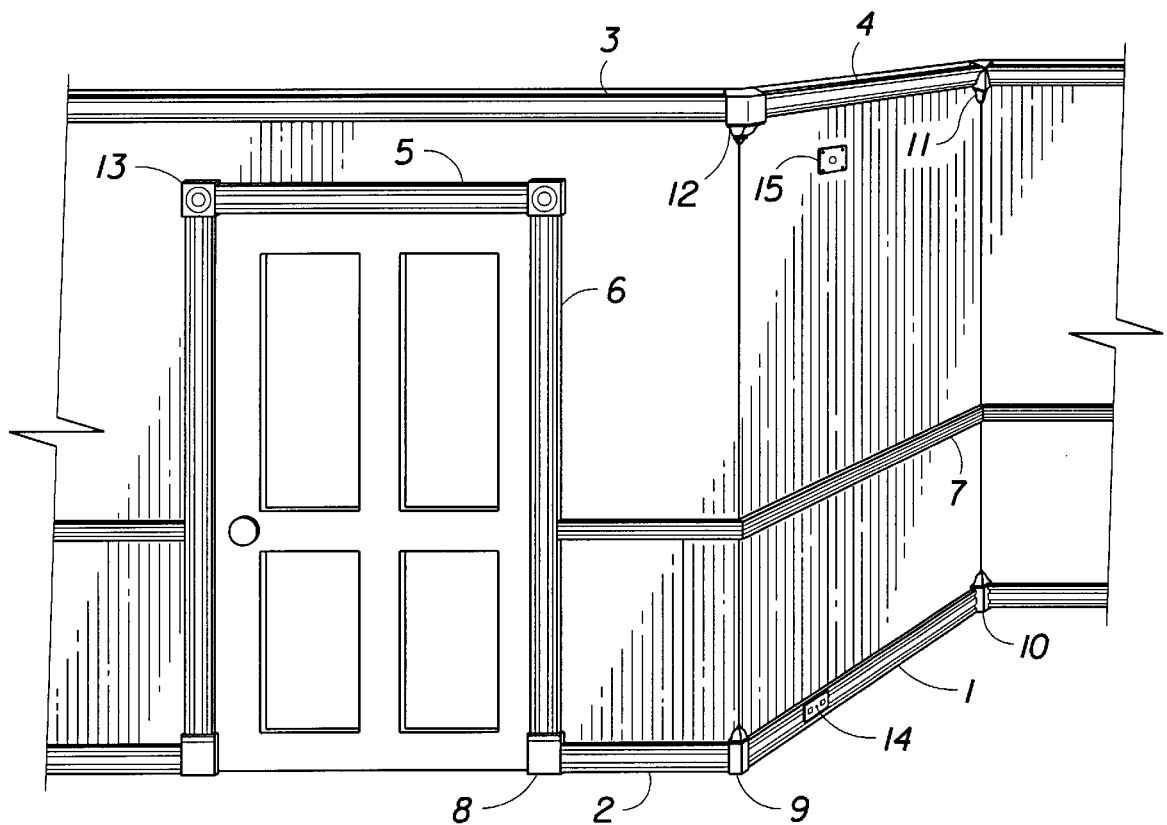
FIG. 1 is a partial perspective view illustrating the outward, finished appearance of the moldings of the present invention, which have been installed in the interior of a residence.

In accordance with the present invention, FIG. 1 shows interior walls and a door in a home with a system of decorative moldings of the present invention covering the low-voltage wiring of a home automation system. Baseboard moldings 1, 2 have the appearance of decorative baseboard, but also provide channels or conduits for wiring and cables. Cornice or crown moldings 3, 4 are also designed to cover wiring and cables along the upper part of a room. Casing moldings 5, 6 around a doorway provide channels or conduits for home automation or networking cables and wiring; they are particularly useful for extending the electrical connections around doors and windows of rooms and throughout homes. Chair rail 7, an alternative decorative molding, provides a channel or conduit for connecting circuits and networks at a height a few feet above floor level. Base block 8 is an example of a millwork piece installed at the intersection of the baseboard 2 and the door casing 6. Each such piece has openings on the side that abuts the baseboard 2 and on the top that abuts the door casing 6. With this design, the base block 8 presents a finished appearance on its exposed surfaces, while permitting the passage of cables and wiring from the end of the baseboard 2 through the base block 8 and into the door casing 6. Millwork pieces such as the outside base corner 9, the inside base corner 10, the inside crown comer 11, the outside crown comer 12, and the casing comer block 13 are designed like the base block 8. That is, adjacent moldings have visible surfaces which fit together tightly, while having openings on each surface that abuts another molding of the present invention. Devices may be connected to the wiring or cables at jack 14 and receptacle 15.

Figure 2:
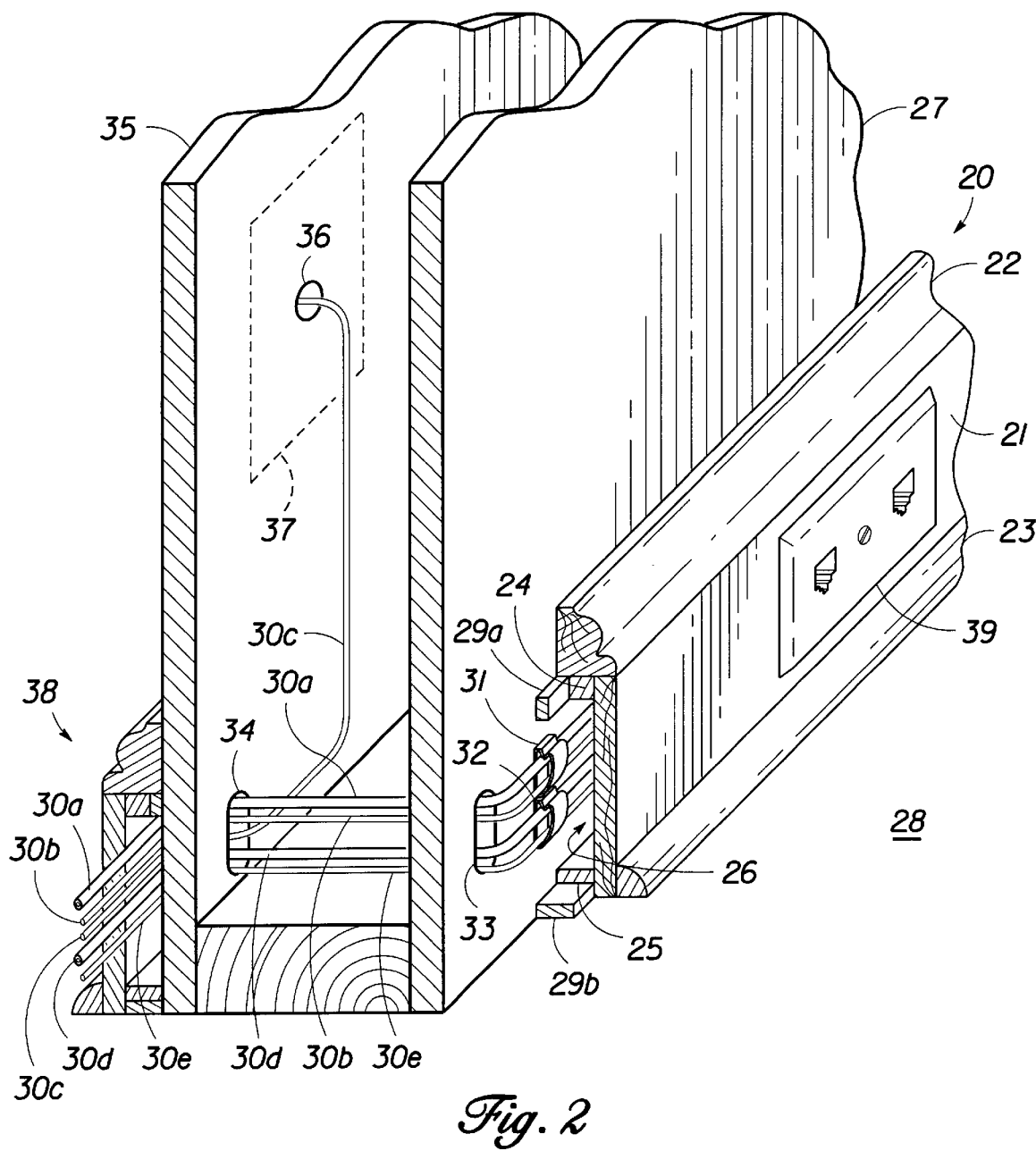
FIG. 2 is a fragmentary, partial cutaway view of a section of unitary baseboard installed according to the present invention.

FIG. 2 illustrates the features and functionality of a unitary baseboard molding 20 made according to the subject invention. The baseboard molding 20 has the appearance of classical or typical interior wood trim comprising a support board 21, design elements 22 and often a carpet strip 23. An upper spacer 24 and a lower spacer 25 affixed to the back of the support board 21 define a channel or conduit 26 between the support board 21 and the wall 27 and floor 28 to which it is attached. The baseboard molding 20 is removably affixed to the wall 27 and floor 28 by means of strips of double-stick foam tape 29a, 29b, adhesive strips of a hook and loop fastening system (Velcro®), or strips of reclosable fasteners. The baseboard molding 20 of the present invention has much utility. It hides and protects wires and cables 30a, 30b, 30d, 30e as they pass along the lower perimeter surface of a room. The wires and cables 30a, 30b, 30d, 30e can be supported and separated by support means such as commercially-available adhesive cable clamps 31, 32, which are also hidden. The baseboard molding 20 also covers openings 33, 34 in the walls 27, 35 that may be required for passage of cables and wires 30a, 30b, 30c, 30d, 30e. The baseboard molding 20 of the present invention can also cover access holes 36 to the wall space, floor space, or other interior structure space to permit connection of wiring 30c to a jack or receptacle 37 that may be mounted on structural surfaces other than the baseboard molding 38 itself. Also, the support board 21 may be fitted with outlets or jacks 39 or other connections for electronic devices.

Figure 3:
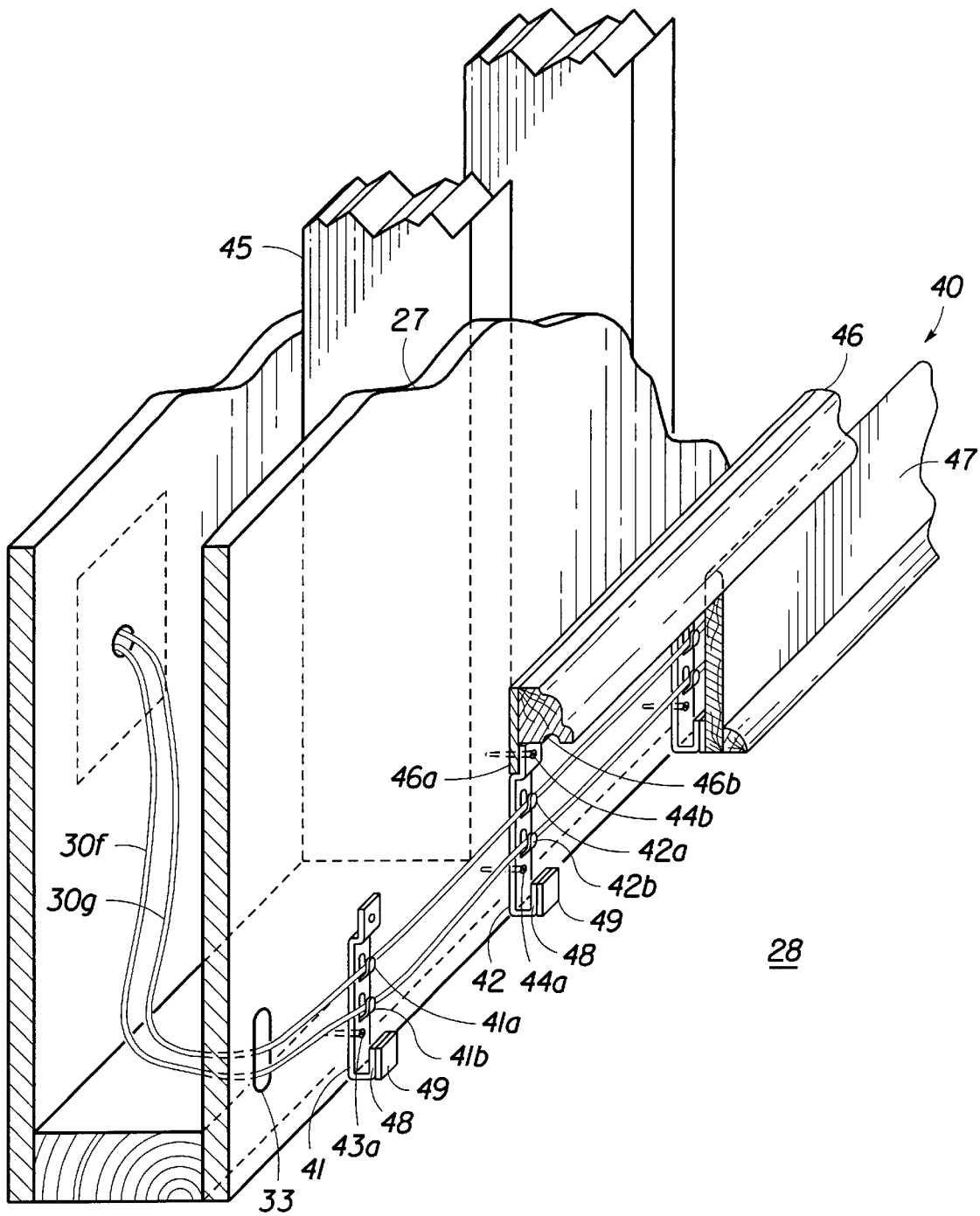
FIG. 3 is a fragmentary, partial cutaway view of a section of two-piece baseboard installed according to an alternate embodiment of the present invention.

FIG. 3 illustrates an alternative two-part embodiment of the baseboard molding 40 of the present invention. When installed, the baseboard molding 40 has the appearance of classical or typical interior wood trim. It provides at least one channel or conduit between itself and the wall 27 and floor 28 to which it is attached, and it is affixed by temporary means. In this example, brackets 41, 42 are first attached to the wall by means of a screw 43a, 44a, preferably at the location of a wall stud 45. The brackets 41, 42 may have support hooks 41a, 41b, 42a, 42b for holding and separating lengths of wiring and cables 30f, 30g. Then the base cap 46 is cut to fit the desired length and placed on top of the brackets 41, 42, with the tongue 46a of the base cap 46 inserted between the L-shaped portion of the brackets 41, 42 and the wall 27. The base cap 46 is shaped with a decorative exposed surface and a functional groove 46b on the lower side for accommodating the upper edge of the main board 47. A second screw 44b is used to fasten the base cap 46 tightly against the wall 27. Each bracket 41, 42 has a u-shaped bend extending outwardly from the wall 27 and upwardly from the floor 28, forming a tab end 48. A piece of temporary fastening material 49, such as double-stick foam tape, is affixed to the outward-facing side of each tab end 48. The main board 47 has a rounded upper edge, which is inserted into the groove 46b on the lower side of the base cap 46. Then the bottom of the main board 47 is pushed against the tab ends 48 of brackets 41, 42, where it is held in place by the fastening material 49. The main board 47 may later be removed as needed by pulling it away from the brackets 41, 42 and pulling it out of the groove 46b in the base cap 46. This action allows full access to the wiring and cables 30f, 30g without disturbing them or marring the finished surface of the room. The baseboard molding 40 of the present invention may also be fitted with outlets, jacks or other connections to electronic devices on the surface of the main board 47.

Figure 4:
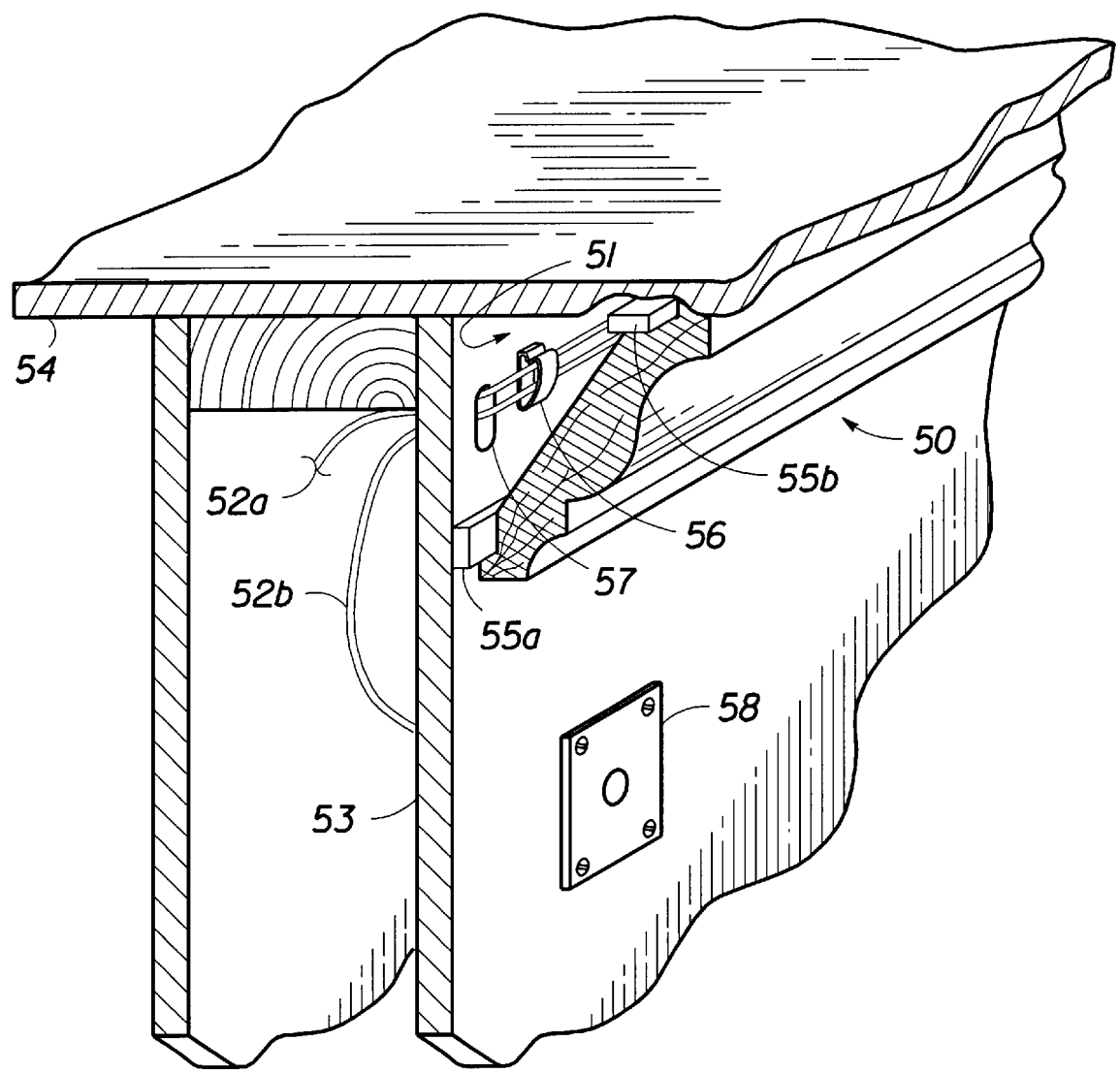
FIG. 4 is a fragmentary, partial cutaway view of a section of unitary cornice molding installed according to the present invention.

FIG. 4 represents an example of the cornice (or crown) molding 50 of the present invention. The cornice molding 50 may be constructed of one or more pieces forming the decorative molding. When installed, the crown molding 50 defines a channel or conduit 51 for wiring and cables 52a, 52b. The cornice molding 50 is attached to the wall 53 and at the ceiling 54 by strips of temporary fastening material 55a, 55b, such as the 3M™ Dual Lock™ reclosable fasteners, or other means that permit periodic installation and removal of the cornice molding 50 without substantial disturbance of the wiring and cables 52a, 52b, the cable clips 56, or the surface of the wall 53 and ceiling 54 to which the cornice molding 50 is attached. The cornice molding 50 of the present invention covers and protects wiring and cables 52a, 52b and cable clips 56, and covers openings 57 in the wall 53 or ceiling 54 which may be made to install the automation or network system or make connections to a wall-mounted jack 58 or a ceiling-mounted jack.

Figure 5:
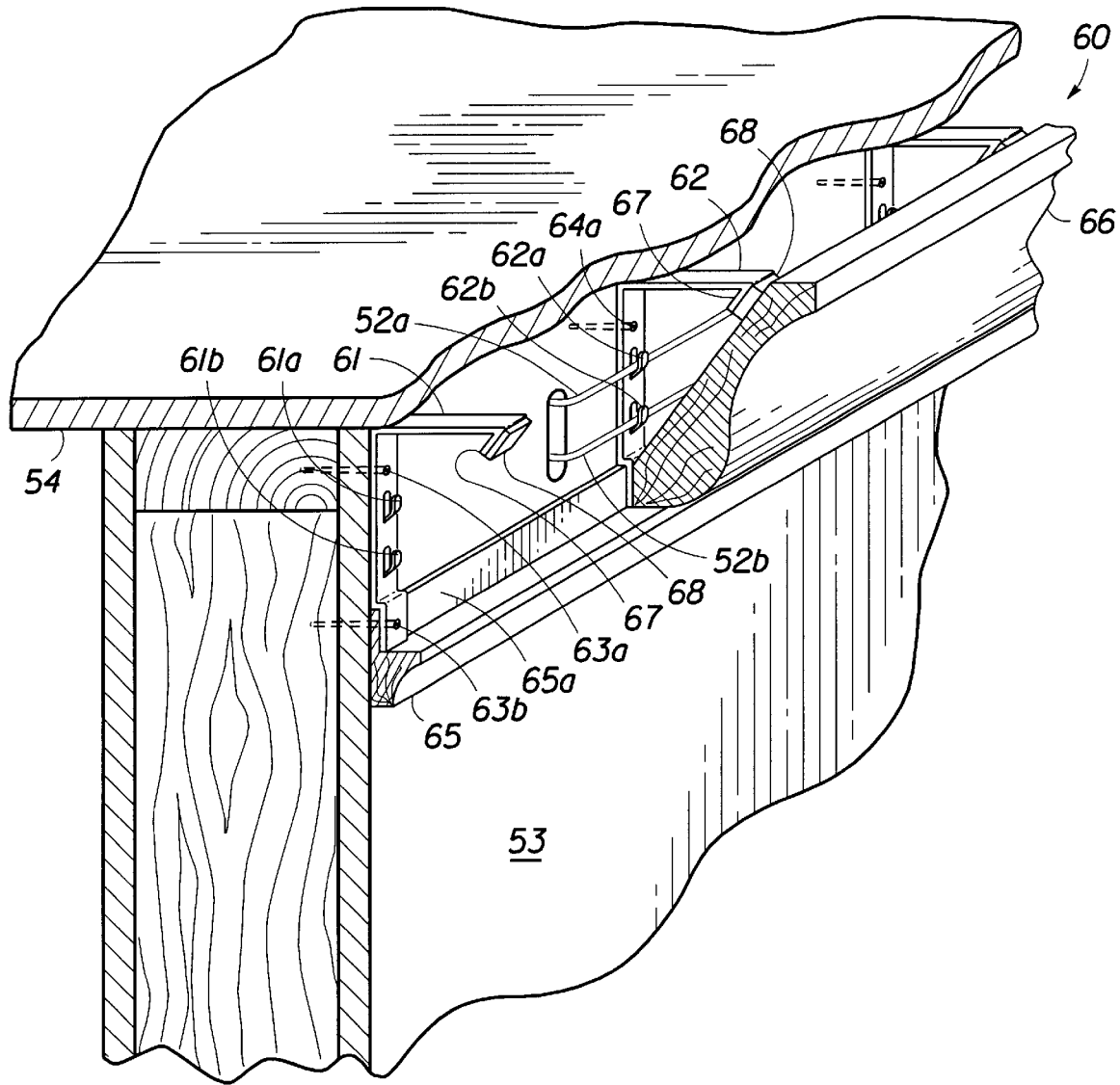
FIG. 5 is a fragmentary, partial cutaway view of a section of two-piece cornice molding installed according to an alternate embodiment of the present invention.
Figure 6:
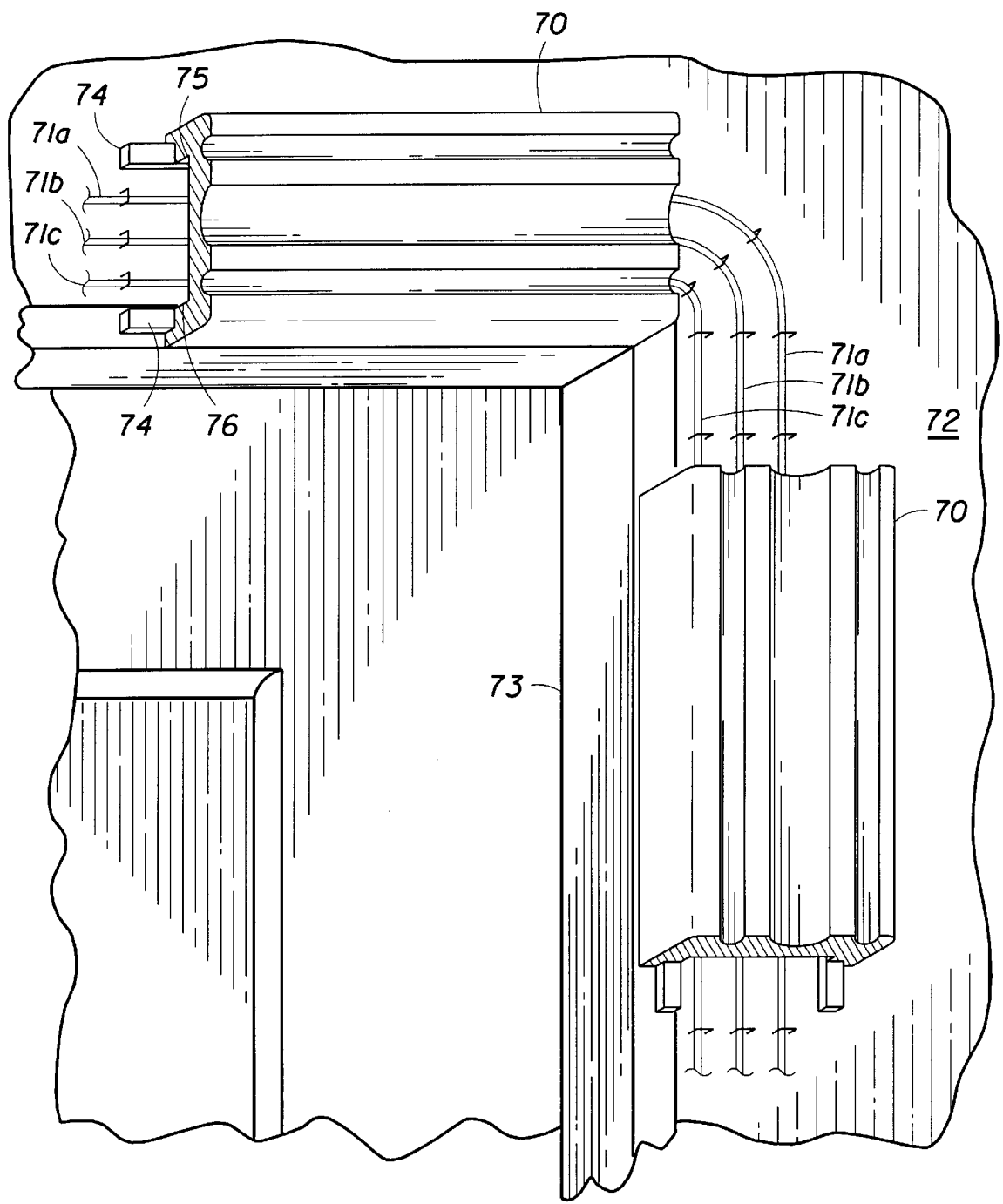
FIG. 6 is a fragmentary, partial cutaway view of sections of unitary casing molding installed according to an alternate embodiment of the present invention.

FIG. 5 illustrates an alternative two-part embodiment of the cornice molding 60 of the present invention. In this description, the upper part of the molding 60 is called the crown 66, and the lower part is called the ledge 65. When installed, the cornice molding 60 provides a channel or conduit between itself and the wall 53 and ceiling 54 to which it is removably attached. In the example shown, each angled bracket 61, 62 is first attached to the wall 53 by means of a screw 63a, 64a. The angled brackets 61, 62 may have support hooks 61a, 61b, 62a, 62b for holding and separating lengths of wiring and cables 52a, 52b. Then the ledge 65 is cut to fit the desired length and the tongue 65a of the ledge 65 is inserted between the L-shaped sections of angled brackets 61, 62 and the wall 53. The ledge 65 can have a functional groove in its upper surface for accommodating the lower edge of the crown 66. A second screw 63b is used to fasten the ledge 65 tightly against the wall 53. Each bracket 61, 62 has a forward-extending portion with a tab end 67 angled back toward the wall 53. A piece of temporary fastening material 68, such as double-stick foam tape, is affixed to the outward-facing side of each tab end 67. If a Velcro® fastening system is used, pieces of the hook portion will be affixed to each tab end 67, and pieces of matching loop portions will be affixed at places on the back of the crown 66 where it will come in contact with the tab ends 67 of the angled brackets 61, 62. After the lower edge of the crown 66 is placed on the upper side of the ledge 65, the upper portion of the crown 66 is pushed against the angled brackets 61, 62, where it is held in place by the fastening material 68. The crown 66 may be removed by pulling it away from the angled brackets 61, 62. FIG. 6 shows portions of decorative casing molding 70 around a door frame, made according to the present invention. The casing molding 70 is constructed to create a channel for wiring and cables 71a, 71b, 71c while having the visible surface of finished molding. The casing molding 70 is attached to the wall 72 and doorjamb 73 by means of a temporary fastening material 74, such as double-stick foam tape. Strips of the fastening material 74 are attached to the rear edges 75, 76 of the casing molding 70, and it is pressed into place against the wall 72 and the doorjamb 73. The casing molding 70 can be removed for modification of the wiring system without substantial disturbance to the wiring 71a, 71b, 71c, any wiring attachments, the finished wall 72, or the door jamb 73.

Figure 7:
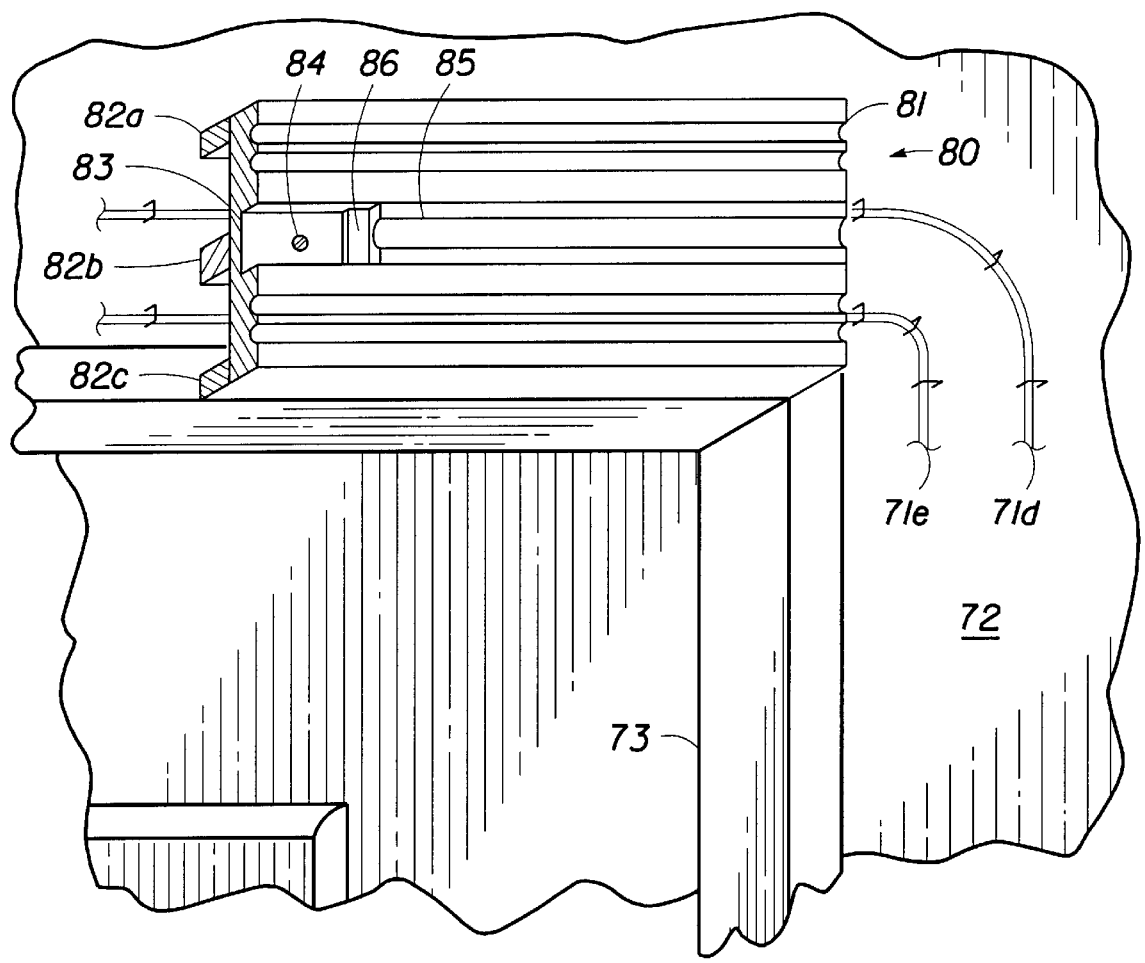
FIG. 7 is a fragmentary, partial cutaway view of a section of casing molding with a removable portion, installed according to an alternate embodiment of the present invention.
Figure 8:
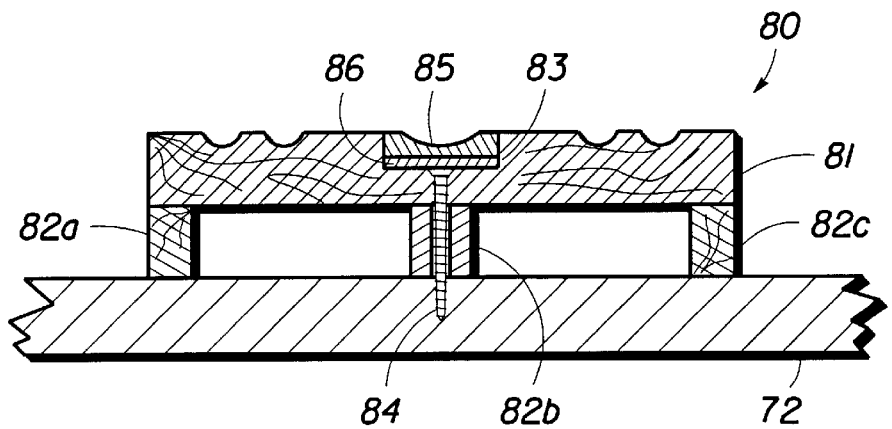
FIG. 8 is a cross-sectional view of the casing molding with a removable portion.

FIG. 7 shows an alternate embodiment of the casing molding 80, with two channels for running wiring 71d and cables 71e. The outer casing 81 has three supports, 82a, 82b, 82c. A groove 83 is cut into the outer casing 81 along the center of its length. Screws 84 inserted through the center support 82b are used to fasten the casing molding 80 into place against the wall 72. Insert 85, with a visible surface complementing the design of the casing molding 80, fits into the groove 83 to hide the screws 84 and to create a finished appearance. The insert 85 is held in place by pieces of temporary fastening material 86, such as double-stick foam tape. The detail drawing in FIG. 8 shows the placement of the screws 84 more clearly. The screw 84 has been inserted through the center support 82b of casing molding 80, attaching it to the wall 72. The insert 85 hides the screws 84. If modification to the wiring system is needed, the insert 85 is removed and the screws 84 removed, without substantial disturbance to the wiring or the finished wall 72 or doorjamb 73.

It is to be understood that the above-described embodiments are illustrated only of the application of the principles of the present invention. Numerous modifications and alternative embodiments may be devised by those skilled in the art without departing from the spirit and scope of the present invention.

I claim:

1. A system of one or more interior moldings selected from baseboards, cornice moldings, door casings, window casings, chair rails, and corner pieces, one of said moldings having an exposed front face and a back side, the molding being configured to form a passage for wiring and cables, the moldings comprising a first portion with a tongue and a second portion, and which further includes one or more brackets affixed to an interior surface, each of said brackets having a first end and a second end, the first end used for affixing the tongue of the first portion to the interior surface, and the second end used for spacing the second portion from the interior surface and for holding the second portion in place with a removable attaching means.

2. The system of claim 1 which further includes at least one electrical receptacle mounted therein.

3. A baseboard molding having an exposed front face and a back side, the molding being configured to form a passage for wiring and cables, said molding comprising a first portion with a tongue and a second portion, and which further includes one or more brackets affixed to an interior surface, each of said brackets having a first end and a second end, the first end used for affixing the tongue of the first portion to the interior surface, and the second end used for spacing the second portion from the interior surface and for holding the second portion in place with a removable attaching means.

4. The molding of claim 3 which further includes at least one electrical receptacle mounted therein.

5. A cornice molding having an exposed front face and a back side, the molding being configured to form a passage for wiring and cables, said molding comprising a first portion with a tongue and a second portion, and which further includes one or more brackets affixed to an interior surface, each of said brackets having a first end and a second end, the first end used for affixing the tongue of the first portion to the interior surface, and the second end used for spacing the second portion from the interior surface and for holding the second portion in place with a removable attaching means.

6. The cornice molding of claim 5 wherein the exposed front face of molding has design features complementary to an architectural style.

7. The molding of claim 5 which further includes at least one electrical receptacle mounted therein.

8. A molding having an exposed front face and a back side, the molding being configured to form a passage for wiring and cables, said molding comprising a first portion having a longitudinal groove in the front face and a removable second portion, said first portion being affixed to an interior surface with one or more screws spaced along the groove, and the back side of the second portion fitting into the groove over the screws.

9. The molding of claim 8 wherein the back side of the second portion is removably attached to the first portion with attaching means selected from double-stick foam tape, a hook and loop fastening system, and reclosable fasteners.

10. The molding of claim 8 which further includes at least one electrical receptacle mounted therein.

* * * * *